(12) United States Patent
Fleming et al.

(10) Patent No.: US 8,333,594 B2
(45) Date of Patent: Dec. 18, 2012

(54) DISPLAY HAVING A 3D AESTHETIC COMPONENT ATTACHED THERETO

(75) Inventors: Lisa Nixon Fleming, Greenboro, NC (US); Pamela Sue Thayer, Thomasville, NC (US)

(73) Assignee: Carson-Dellosa Publishing Co., Inc., Greensboro, NC (US)

( * ) Notice: Subject to any disclaimer, the term of this patent is extended or adjusted under 35 U.S.C. 154(b) by 498 days.

(21) Appl. No.: 12/342,714

(22) Filed: Dec. 23, 2008

(65) Prior Publication Data

US 2010/0304351 A1    Dec. 2, 2010

(51) Int. Cl.
    G09B 25/00    (2006.01)
(52) U.S. Cl. ...... 434/428; 434/430; 446/148; 40/124.08
(58) Field of Classification Search ............ 434/96, 434/97, 408–410, 415, 417, 418, 421, 428, 434/430, 431; 446/148; 40/124.01, 124.08
    See application file for complete search history.

(56) References Cited

U.S. PATENT DOCUMENTS

| | | | | |
|---|---|---|---|---|
| D174,188 S | * | 3/1955 | Martin | D19/52 |
| 4,874,356 A | * | 10/1989 | Volkert | 493/335 |
| 5,078,670 A | * | 1/1992 | Volkert | 493/346 |
| 5,259,133 A | * | 11/1993 | Burtch | 40/124.08 |
| 5,359,794 A | * | 11/1994 | Wood | 40/789 |
| 5,450,680 A | * | 9/1995 | Bromberg | 40/124.08 |
| 5,455,098 A | * | 10/1995 | Cheng | 428/121 |
| 5,564,208 A | * | 10/1996 | Bergman | 40/539 |
| 5,682,999 A | * | 11/1997 | Larson | 206/768 |
| 5,916,650 A | * | 6/1999 | Rosenbaum et al. | 428/40.1 |
| D444,176 S | * | 6/2001 | Leslie | D19/59 |
| 6,306,485 B1 | * | 10/2001 | Keller | 428/194 |
| 2004/0261938 A1 | * | 12/2004 | Bradford | 156/247 |
| 2005/0132621 A1 | * | 6/2005 | Bostick | 40/124.08 |
| 2006/0099566 A1 | * | 5/2006 | Priem | 434/408 |

OTHER PUBLICATIONS

Peacock Feathers Discovery Trimmers from TREND Enterprises, Inc.; page printed from the Internet, related technology, copyright 1999.
Office Quarters Decorative Borders; 2 pages printed from the Internet; undated related technology.
abctetch.com, page printed from the Internet; copyright 2001-2005.
Schooldoodle.com "School Is Cool" 3D Bulletin Board Border; 2 pages printed from the Internet; undated copyright claim, related technology.

* cited by examiner

*Primary Examiner* — Gene Kim
*Assistant Examiner* — Joseph B Baldori
(74) *Attorney, Agent, or Firm* — MacCord Mason PLLC

(57) ABSTRACT

A showcasing system. The system includes a display board and a silhouetted 3D aesthetic component. The 3D aesthetic component includes (i) an unitary blank movable into a silhouetted 3D aesthetic surface, the 3D aesthetic component being attached to the display board and (ii) a plurality of die cutouts spaced along the longitudinal axis of the blank.

28 Claims, 7 Drawing Sheets

DISPLAY HAVING A 3D AESTHETIC COMPONENT ATTACHED THERETO

BACKGROUND (1) Field

The present inventions relate generally to bulletin and activity boards and, more particularly to a display board and a silhouetted 3D aesthetic component attachable to the display board.

(2) Related Art

"Pop-ups" have previously been used in such areas as greeting card designs, advertising mailers and book illustrations. These "pop-ups" often result in 3D presentations that are usually nestled between two opposing pages until separation of the pages results in extension of the presentation into a raised location. These types of "pop-up" devices involve intricate designs and require positioning between two opposing pages, attachment of separate "pop-up" elements or both. These designs necessitate rigorous assembly, time intensive preparation and prohibitive expense, which exclude their use in the educational field to enhance classroom and educational displays.

Teachers use classroom displays to augment the learning experience and to enhance the aesthetics within the classroom. Classroom displays often are changed weekly or monthly. However, educators work on time constraints and strict budgets and therefore any displays utilized must be affordable and easily manipulated.

Thus, there remains a need for a new and improved showcasing system, which includes a silhouetted 3D aesthetic component, while at the same time, the 3D aesthetic component may be packaged in a flat blank and then moved into a silhouetted 3D aesthetic surface.

SUMMARY OF THE INVENTIONS

The present inventions are directed to a showcasing system including a display board; a silhouetted 3D aesthetic component, the 3D aesthetic component including (i) an unitary blank movable into a silhouetted 3D aesthetic surface, the 3D aesthetic component being attached to the display board and (ii) a plurality of die cut outs spaced along the longitudinal axis of the blank; and means for attaching the 3D aesthetic component to a portion of the display board.

Preferably, the 3D aesthetic component includes a first attachment flap extending along the longitudinal direction of the blank; an elevating panel adjacent to the first attachment flap, the die cut outs being positioned along the crest of the elevating panel; and a score line between the first attachment flap and the elevating panel for folding the elevating panel with respect to the first attachment flap.

In one embodiment, the elevating panel may forms a 3D curved surface. In another, the elevating panel includes at least two portions forming a 3D triangular surface. In still another, the elevating panel includes at least three portions forming a 3D raised surface. The present inventions may further include score lines between each portion of the elevating panel for folding one portion with respect to another portion of the elevating panel to form a 3D raised surface.

Preferably, the die cutouts are partial cuts generally outlining at least one design element illustration. In addition, the partial cuts portions of the die cutouts may extend transversely from the longitudinal axis of the elevating panel. In one embodiment, the partial cut portions of the die cutouts are cantilevered with respect to the remainder of the elevating panel and extend outwardly above the attachment flap.

In one embodiment, the crest portion of the elevating panel is more visually vivid than the remainder of the elevating panel for accentuating the height of the crest portion of the elevating panel. In another embodiment, the attachment flap also is more visually vivid than the remainder of the elevating panel for accentuating the height of the crest portion of the elevating panel.

Finally, the blank may further include a second attachment flap along the edge of the elevating panel opposite the first attachment flap and a second score line between the second attachment flap and the elevating panel for folding the elevating panel with respect to the second attachment flap.

Preferably, the means for attaching the 3D aesthetic component to a portion of the display board is selected from the group consisting of staples, pushpins, adhesive tape, double stick tape, tacks and adhesive putty and combinations thereof. In addition, the display may further include decorations, pictures and educational materials and combinations thereof.

Preferably, the display board includes a display area and an edge forming the outer perimeter of the display area. Also, it may further include a frame attached to at least a portion of the outer perimeter of the display board.

Preferably, the display board may be selected from the group consisting of bulletin boards, activity boards, pocket charts and white boards and combinations thereof. Also preferably, the display area may be selected from the group consisting of cork, dry erase board, chalkboard, fabric and metal and combinations thereof.

Accordingly, one aspect of the present inventions is to provide a showcasing system including: a display board; and a blank movable into a silhouetted 3D aesthetic component, the 3D aesthetic component being attachable to the display board.

Another aspect of the present inventions is to provide a 3D aesthetic component for attachment to a display board or the like, the 3D aesthetic component including: an unitary blank movable into a silhouetted 3D aesthetic surface, the 3D aesthetic component being attachable to the display board; and a plurality of die cut outs spaced along the longitudinal axis of the blank.

Still another aspect of the present inventions is to provide a showcasing system including: a display board; a silhouetted 3D aesthetic component, the 3D aesthetic component including (i) an unitary blank movable into a silhouetted 3D aesthetic surface, the 3D aesthetic component being attached to the display board and (ii) a plurality of die cut outs spaced along the longitudinal axis of the blank; and means for attaching the 3D aesthetic component to a portion of the display board.

These and other aspects of the present inventions will become apparent to those skilled in the art after a reading of the following description of the preferred embodiment when considered with the drawings.

DESCRIPTION OF THE PREFERRED EMBODIMENTS

Figure 1:
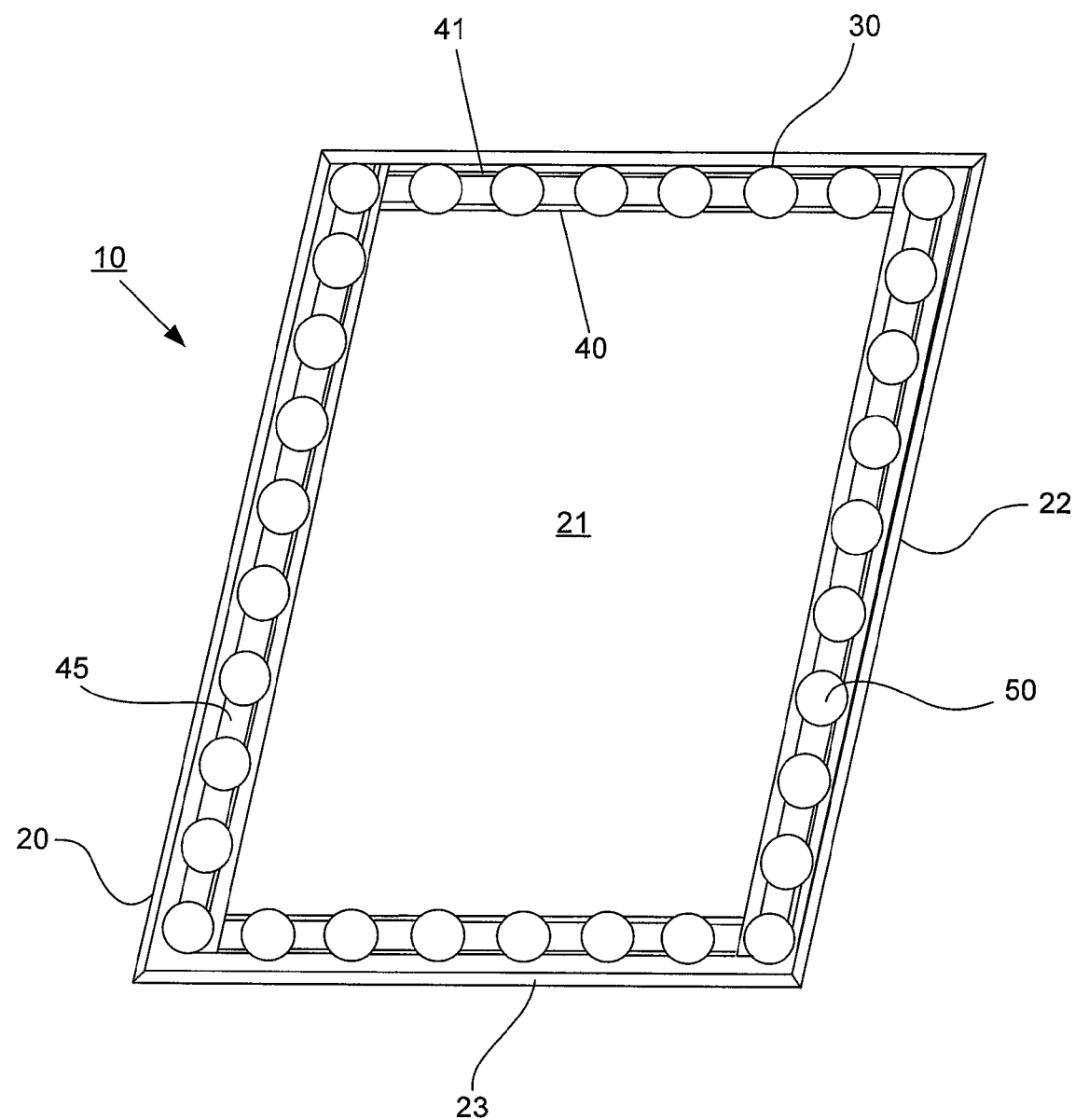
FIG. 1 is a top perspective view of a display board having a 3D aesthetic component attached constructed according to the present inventions.

In the following description, like reference characters designate like or corresponding parts throughout the several views. Referring now to the drawings in general, it will be understood that the illustrations are for the purpose of describing preferred embodiments of the inventions and are not intended to limit the inventions thereto.

As best seen in FIG. 1, a showcasing system, generally designated 10, is shown. The showcasing system 10 includes a display board 20 and a 3D aesthetic component 30. Display board 20 can be a device such as a bulletin board, activity board, pocket chart or white board, and includes a display area 21 and edges 22 forming the outer perimeter of display area. Display area 21 can be a substrate such as cork, dry erase board, chalkboard, fabric and metal and combinations thereof. Frame 23 is optionally attached to edges 22.

Figure 2:
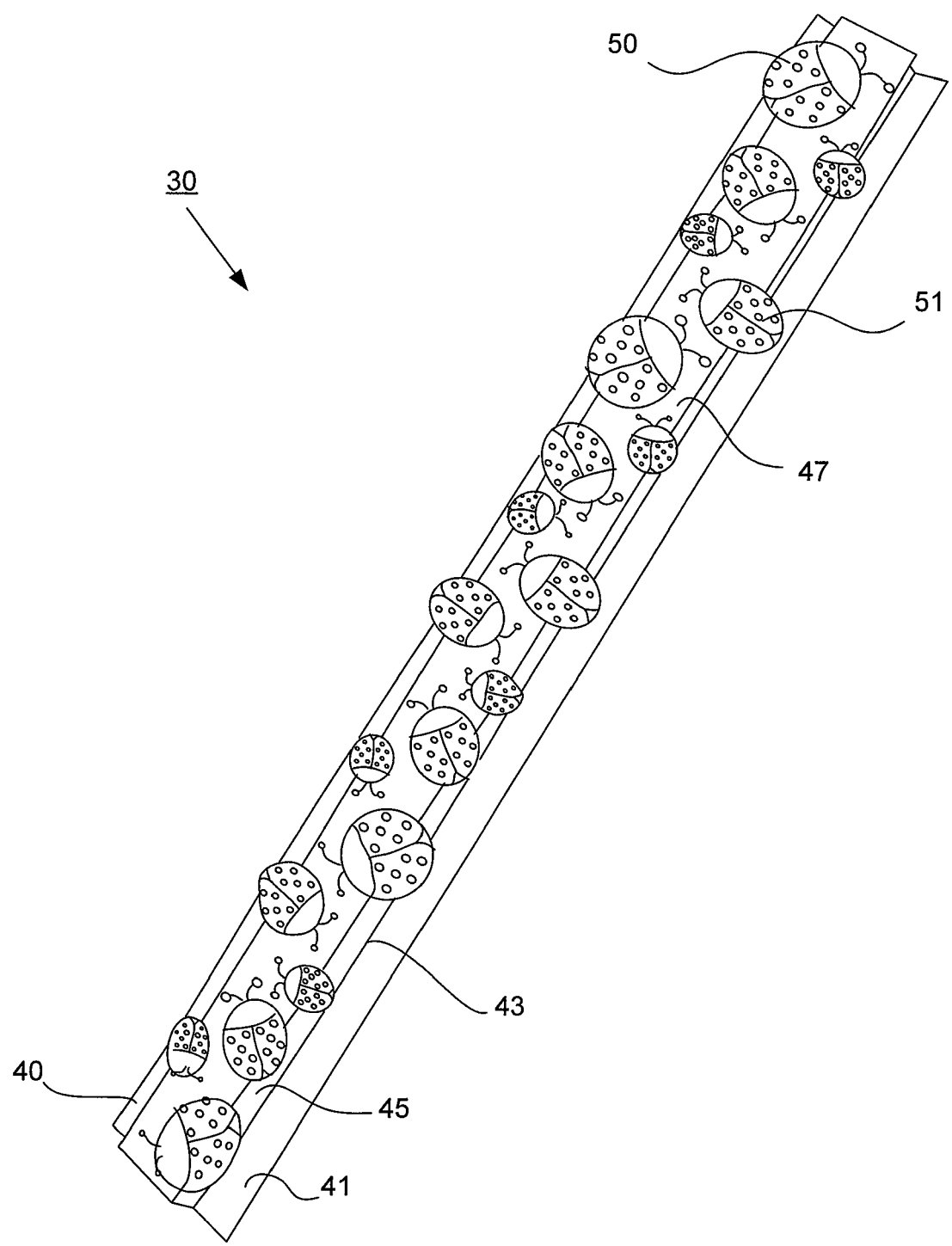
FIG. 2 is a top perspective view of the 3D aesthetic component.
Figure 4:
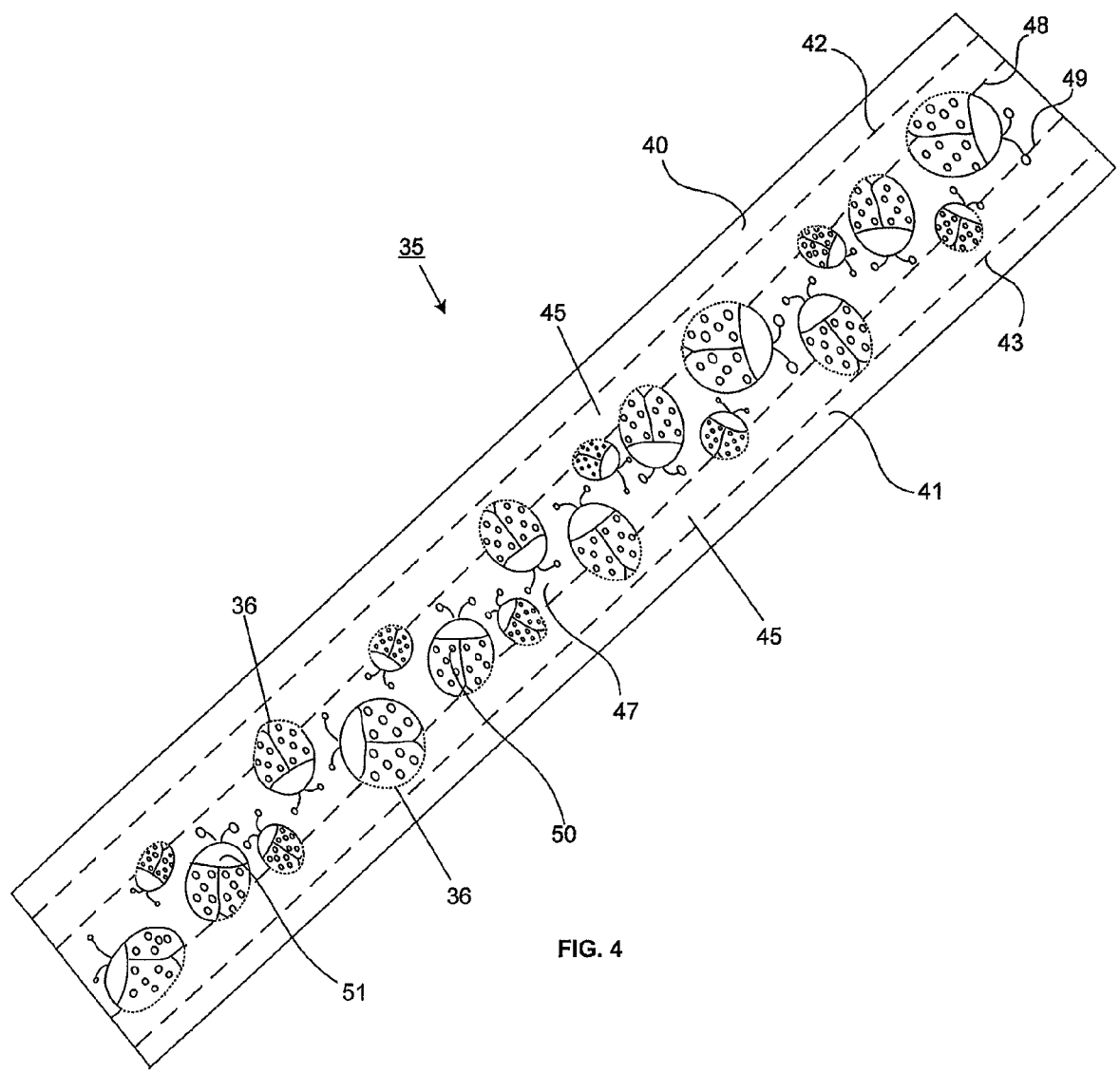
FIG. 4 is a top view of a blank constructed according to the present inventions, which is movable into the 3D aesthetic component.
Figure 5A:
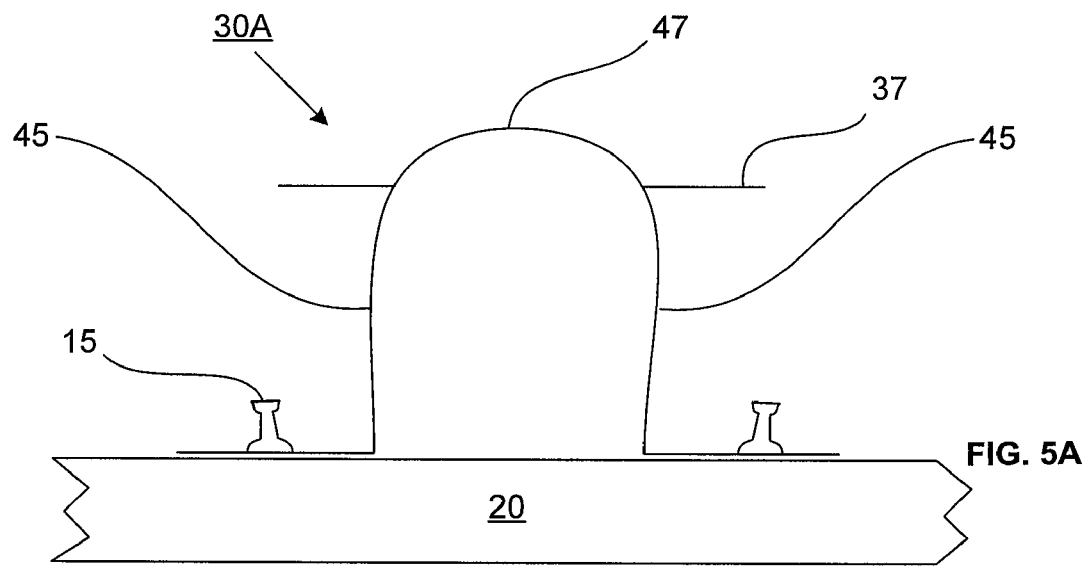
FIG. 5 is a cross-sectional views of four embodiments (5A-5D) of the 3D aesthetic component.
Figure 5B:
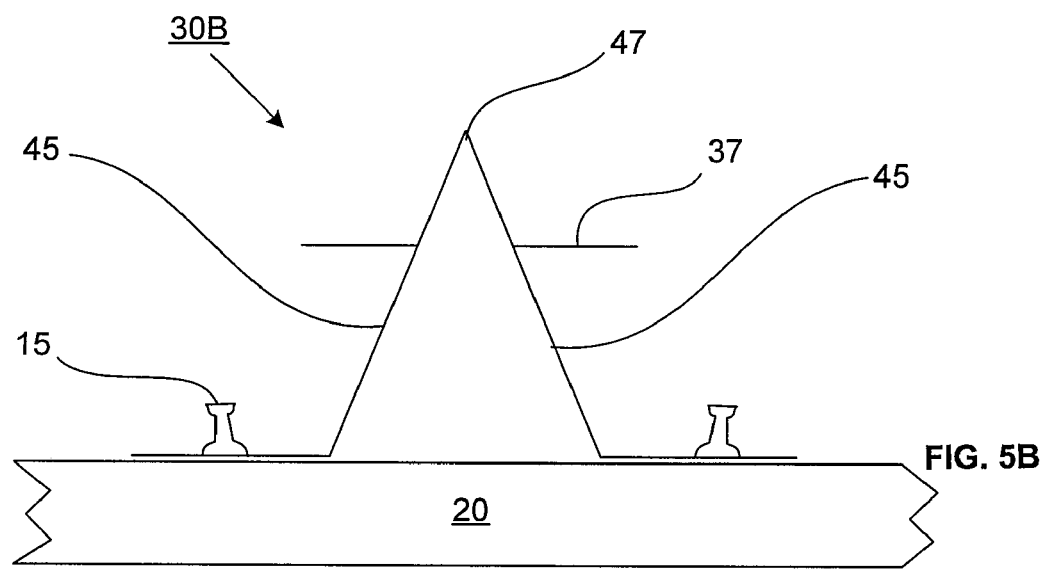
Figure 5C:
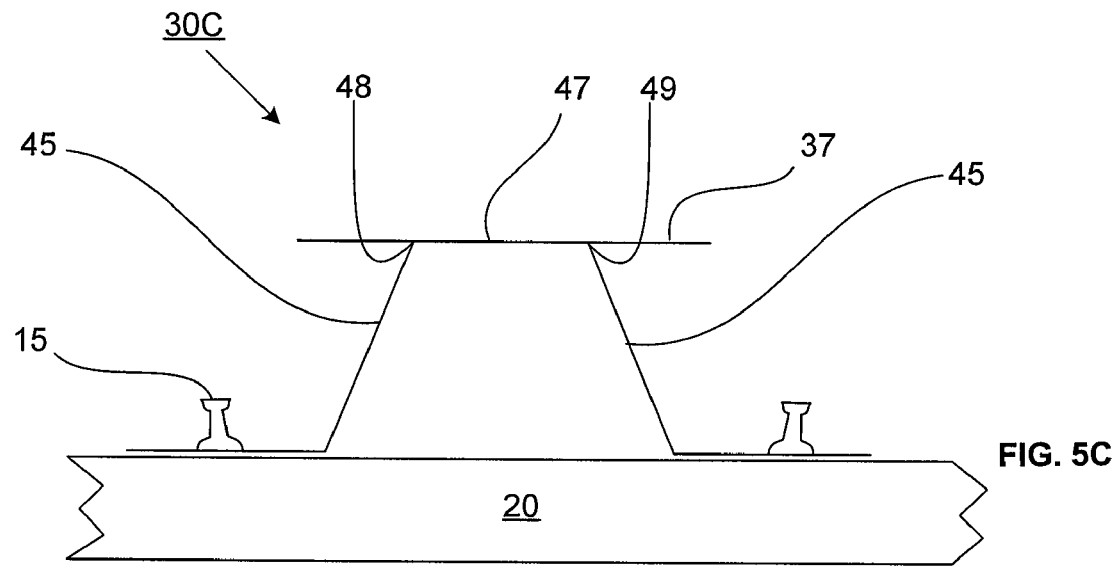
Figure 5D:
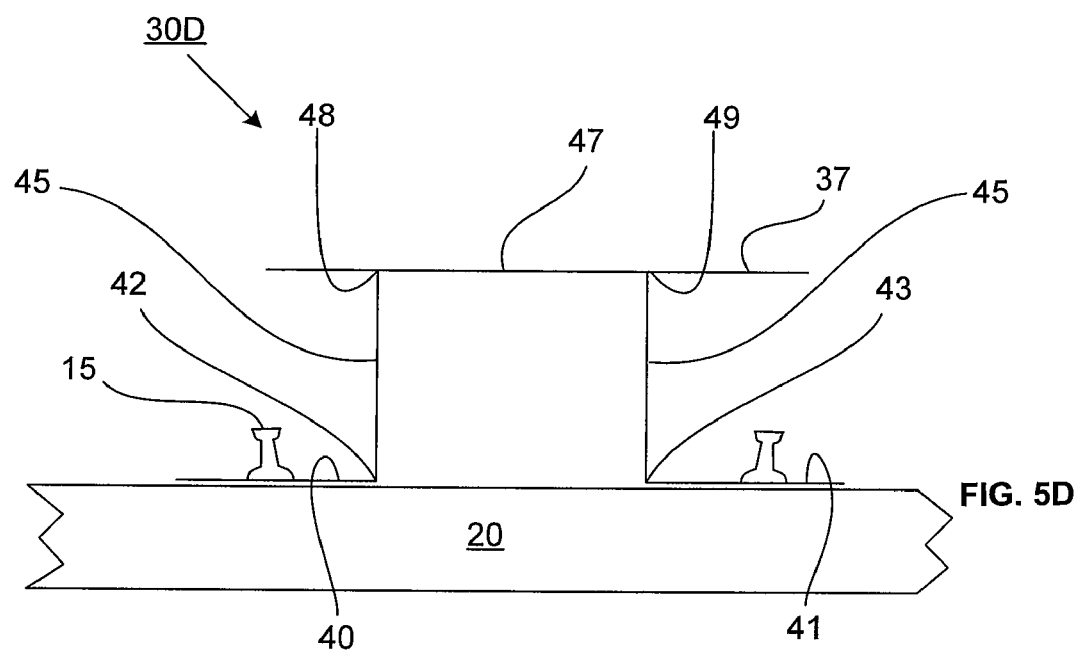

Turning to FIG. 2 and FIG. 4, a blank 35 is movable into the 3D aesthetic component 30. 3D aesthetic component 30 includes design elements 50, first attachment flap 40, second attachment flap 41 and crest 47, and is attachable to display board 20. Preferably; blank 35 is constructed out of cardstock, paper or cardboard with rigidity to it, although other materials such as plastic, metal, fabrics, non-weaved materials and the like are also suitable. Suitable attaching means 15 include staples, pushpins, adhesive tape, double stick tape, tacks, adhesive putty and combinations thereof FIGS. 5A-5D depict suitable placement of attaching means 15, herein shown as pushpins.

Referring now to FIG. 4, it can be seen that blank 35 includes a strip of material comprising a multitude of designs, cuts and scores. Specifically, first attachment flap 40 and second attachment flap 41 each extend along the longitudinal direction of blank 35. As previously shown in FIG. 1, when blank 35 is moved into 3D aesthetic component 30, attachment flaps 40 and 41 receive attaching means 15 for attaching to display board 20.

Inwardly from attachment flaps 40 and 41 are first and second score lines 42 and 43 respectively, which ensure that a user properly folds blank 35 to form 3D aesthetic component 30. Inwardly from score lines 42 and 43 is elevation panel 45, which provides height to 3D aesthetic component 30, as best shown in FIG. 3.

As best seen in FIG. 5, in the 3-sided embodiments, generally designated 30C and 30D (FIGS. 5C and 5D), third and fourth score lines 48 and 49 respectively are inward from score lines 42 and 43. In the curved and triangular embodiments, generally designated 30A and 30B (FIGS. 5A and 5B respectively), third and fourth score lines 48 and 49 are not present. Crest 47 is the uppermost portion of elevation panel 45.

As previously shown in FIG. 4, die cutouts 36 formed along elevating panel 45 create design elements 50. Preferably, these die cutouts 36 are partial cuts that generally outline a portion of design illustration 51.

Figure 3:
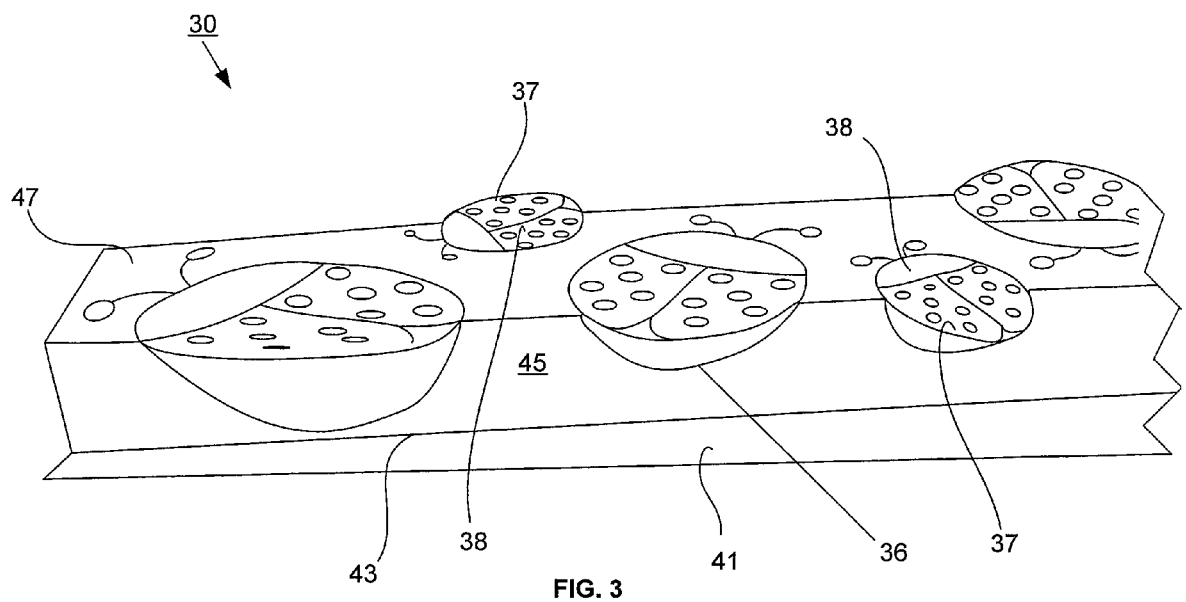
FIG. 3 is a side perspective view of the 3D aesthetic component.

As best seen in FIGS. 2 and 3, when blank 35 is moved into 3D aesthetic component 30, partial cut portions 37 and uncut portions 38 remain planar, with partial cut portions 37 extending transversely from the longitudinal axis of elevating panel 45. Partial cut portions 37 are cantilevered with respect to remainder of elevating panel 45, and extend outwardly above attachment flaps 40 and 41.

As can be appreciated, design illustrations 51 of FIGS. 2-4 are ladybugs, but any illustration, including animals, cartoons, characters, logos, designs, shapes, objects of nature, holiday symbols and graphics and combination thereof should be suitable.

Preferably, crest 47 is colored or shaded to be more visually vivid than the remainder of elevating panel 45, in order to accentuate the height of crest 47. It is also preferable that attachment flaps 40 and 41 are also colored or shaded to be more visually vivid than non-crest portion of elevating panel. Visual vividness can be achieved by providing visually interesting and eye catching colors, designs, textures and/or features to crest 47 and/or attachment flaps 40 and 41, while providing more muted colors, designs, textures and/or features elsewhere for contrast.

Figure 6:
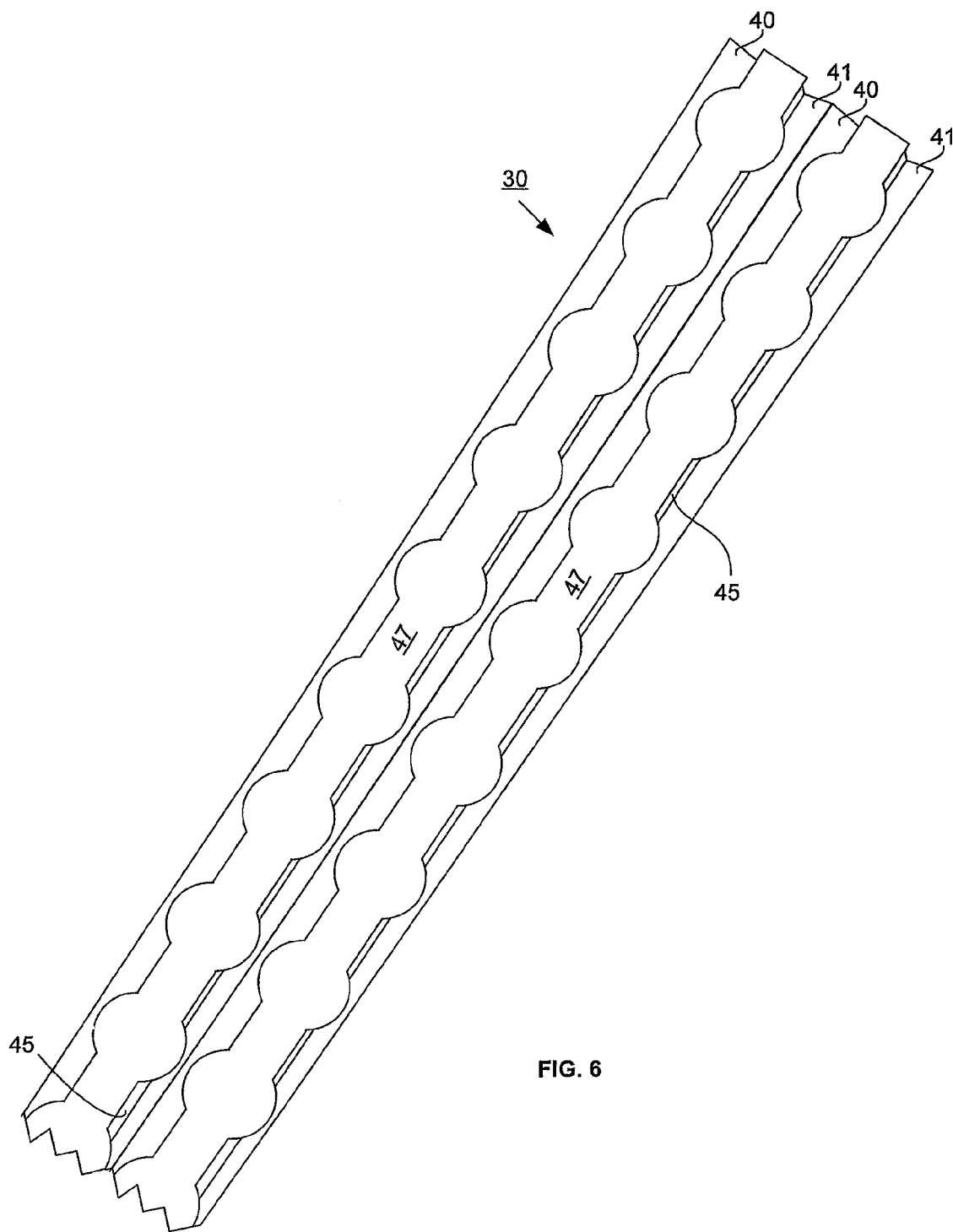
FIG. 6 is a top perspective view of another embodiment of the 3D aesthetic component.

Finally, FIG. 6 illustrates another embodiment wherein multiple 3D aesthetic components are longitudinally adjacent, thereby creating substantially parallel crests 47.

In operation, a user of the showcasing system 10 would take at least one blank 35 and then fold it along first and second score lines 42 and 43, and possibly along third and fourth score lines 48 and 49. The user would then attach the resulting 3D aesthetic component 30 to display board 20, preferably along edge 22. Finally, the user could then attach, for example, pictures or educational material, onto display area 21 to complete the display.

Certain modifications and improvements will occur to those skilled in the art upon a reading of the foregoing description. By way of example, design features such as glitter, fabric, reflective material, "googly eyes" and lights could be added to design illustration 51. Also, a string of lights could be run in hollow portion created between elevating panel 45 and display board 20 (not numbered but shown in FIGS. 5A-5D). Moreover, paper, fabric other textiles could be inserted into the diecut openings for further decoration. It should be understood that all such modifications and improvements have been deleted herein for the sake of conciseness and readability but are properly within the scope of the following claims.

We claim:

1. A 3D aesthetic component for attachment to a display board or the like, said 3D aesthetic component consisting of:
    (a) a unitary blank having a plurality of substantially parallel score lines along a longitudinal axis, wherein said unitary blank and is folded along said score lines into a silhouetted 3D aesthetic surface by the end user, said 3D aesthetic component being attachable to the display board by the end user;
    (b) a plurality of partial die cutouts spaced along the longitudinal axis on an elevating panel located between an attachment flap and a crest; and
    (c) a plurality of design elements located on the crest along the longitudinal axis, said elements having a cut portion and an uncut portion, wherein said cut portion is formed by said die cutouts when said blank is folded into said silhouetted 3D component said cut portion extending outward from the longitudinal axis to cantilever above said attachment flap of said 3D component when said elevating panel raises said element to provide a height to the 3D aesthetic component greater than that of said blank.

2. The device according to claim 1, wherein the 3D aesthetic component includes a first attachment flap and a second attachment flap extending along the longitudinal direction of said blank; said elevating panel is adjacent to said first and second attachment flap, and a score line between said first attachment flap and said elevating panel and said second attachment flap and said elevating panel for folding said elevating panel with respect to said first and second attachment flap.

3. The device according to claim 2, wherein said elevating panel forms a 3D curved surface.

4. The device according to claim 2, wherein said elevating panel includes at least two portions forming a 3D triangular surface.

5. The device according to claim 4, wherein said elevating panel includes at least three portions forming a 3D raised surface.

6. The device according to claim 4 further including score lines between each portion of said elevating panel for folding one portion with respect to another portion of said elevating panel to form a 3D raised surface.

7. The device according to claim 2, wherein said die cutouts are partial cuts generally outlining at least one design element illustration.

8. The device according to claim 7, wherein the partial cuts portions of said die cutouts extend transversely from the longitudinal axis of said elevating panel.

9. The device according to claim 8, wherein said partial cut portions of said die cut outs are cantilevered with respect to the remainder of said elevating panel and extend outwardly above said attachment flap.

10. The device according to claim 2, wherein the crest portion of said elevating panel is more visually vivid than the remainder of said elevating panel for accentuating the height of the crest portion of said elevating panel.

11. The device according to claim 10 wherein said attachment flap also is more visually vivid than the remainder of said elevating panel for accentuating the height of the crest portion of said elevating panel.

12. A showcasing system comprising:
(a) a display board;
(b) a silhouetted 3D aesthetic component, said 3D aesthetic component consisting of (i) an unitary blank having a plurality of substantially parallel score lines along a longitudinal axis, wherein said unitary blank is folded along said score lines into a silhouetted 3D aesthetic surface, by the end user said 3D aesthetic component being attached to said display board by the end user and (ii) a plurality of partial die cut outs spaced along the longitudinal axis on an elevating panel located between an attachment flap and a crest;
(c) a plurality of design elements located on the crest along the longitudinal axis, said elements having a cut portion and an uncut portion, wherein said cut portion is formed by said die cutouts when said blank is folded into said silhouetted 3D component, said cut portion extending outward from the longitudinal axis to cantilever above said attachment flap of said 3D component when an elevating panel raises said element to provide a height to the 3D aesthetic component greater than that of said blank; and
(d) means for attaching the 3D aesthetic component to a portion of said display board.

13. The system according to claim 12, wherein said means for attaching the 3D aesthetic component to a portion of said display board is selected from the group consisting of staples, push pins, adhesive tape, double stick tape, tacks and adhesive putty and combinations thereof.

14. The system according to claim 12 further including decorations, pictures and educational materials and combinations thereof.

15. The system according to claim 12, wherein said display board includes a display area and an edge forming the outer perimeter of said display area.

16. The system according to claim 15 further including a frame attached to at least a portion of the outer perimeter of said display board.

17. The system according to claim 12, wherein said display board is selected from the group consisting of bulletin boards, activity boards, pocket charts and white boards and combinations thereof.

18. The system according to claim 17, wherein said display area is selected from the group consisting of cork, dry erase board, chalkboard, fabric and metal and combinations thereof.

19. The device according to claim 12, wherein the 3D aesthetic component includes a first attachment flap and a second attachment flap extending along the longitudinal direction of said blank; said elevating panel is adjacent to said first and second attachment flap, and a score line between said first attachment flap and said elevating panel and said second attachment flap and said elevating panel for folding said elevating panel with respect to said first and second attachment flap.

20. The system according to claim 19, wherein said elevating panel forms a 3D curved surface.

21. The system according to claim 19, wherein said elevating panel includes at least two portions forming a 3D triangular surface.

22. The system according to claim 21, wherein said elevating panel includes at least three portions forming a 3D raised surface.

23. The system according to claim 21 further including score lines between each portion of said elevating panel for folding one portion with respect to another portion of said elevating panel to form a 3D raised surface.

24. The system according to claim 19, wherein said die cutouts are partial cuts generally outlining at least one design element illustration.

25. The system according to claim 24, wherein the partial cuts portions of said die cutouts extend transversely from the longitudinal axis of said elevating panel.

26. The system according to claim 25, wherein said partial cut portions of said die cut outs are cantilevered with respect to the remainder of said elevating panel and extend outwardly above said attachment flap.

27. The system according to claim 19, wherein the crest portion of said elevating panel is more visually vivid than the remainder of said elevating panel for accentuating the height of the crest portion of said elevating panel.

28. The system according to claim 27 wherein said attachment flap also is more visually vivid than the remainder of said elevating panel for accentuating the height of the crest portion of said elevating panel.

* * * * *